United States Patent
Guo et al.

(10) Patent No.: US 9,655,163 B2
(45) Date of Patent: May 16, 2017

(54) METHOD AND APPARATUS FOR IMPLEMENTING A DEVICE-TO-DEVICE (D2D) SERVICE IN A WIRELESS COMMUNICATION SYSTEM

(71) Applicant: INNOVATIVE SONIC CORPORATION, Taipei (TW)

(72) Inventors: Yu-Hsuan Guo, Taipei (TW); Meng-Hui Ou, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 117 days.

(21) Appl. No.: 14/640,568

(22) Filed: Mar. 6, 2015

(65) Prior Publication Data

US 2015/0264733 A1   Sep. 17, 2015

Related U.S. Application Data

(60) Provisional application No. 61/951,132, filed on Mar. 11, 2014.

(51) Int. Cl.
| | |
|---|---|
| *H04W 76/02* | (2009.01) |
| *H04W 76/04* | (2009.01) |
| *H04W 48/06* | (2009.01) |
| *H04W 8/00* | (2009.01) |

(52) U.S. Cl.
CPC ......... *H04W 76/046* (2013.01); *H04W 48/06* (2013.01); *H04W 76/023* (2013.01); *H04W 8/005* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2012/0082105 A1* | 4/2012 | Hwang | H04W 76/06 370/329 |
| 2014/0056134 A1* | 2/2014 | Koskinen | H04W 48/06 370/230 |
| 2014/0056220 A1 | 2/2014 | Poitau et al. | |
| 2014/0148153 A1* | 5/2014 | Gleixner | H04W 4/005 455/426.1 |
| 2014/0241260 A1* | 8/2014 | Schmidt | H04W 76/023 370/329 |

FOREIGN PATENT DOCUMENTS

| | | |
|---|---|---|
| WO | 2013025040 A2 | 2/2013 |
| WO | 2014014323 A1 | 1/2014 |

OTHER PUBLICATIONS

3GPP TS 36.331 V12.0.0 (Dec. 2013).*
(Continued)

*Primary Examiner* — Hassan Kizou
*Assistant Examiner* — Hashim Bhatti
(74) *Attorney, Agent, or Firm* — Blue Capital Law Firm, P.C.

(57) ABSTRACT

A method and apparatus of for implementing a D2D service are disclosed. The method includes the UE receiving an indication to prohibit a transmission of a RRC connection request message for requesting a D2D dedicated resource for transmission. The method further includes the UE deciding whether to prohibit the transmission of the RRC connection request message at least based on the indication.

20 Claims, 13 Drawing Sheets

(56) References Cited

OTHER PUBLICATIONS

3GPP TR 36.843 V1.2.0 (Dec. 2014).
3GPP TSG-RAN WG2 #85, Feb. 10-14, 2014, Prague, Czech Republic (R2-140474).
3GPP TSG-RAN2 Meeting#84, San Francisco, USA, Nov. 11-15, 2013 (R2-134287).
SA WG2 Meeting#101bis, San Jose Del Cabo, Mexico, Feb. 17-21, 2014 (S2-140804).
Search Report on corresponding EP Patent Application No. 15158631.0 dated Jun. 23, 2015.
Search Report on corresponding EP Patent Application No. 15158638.5 dated Jun. 30, 2015.

* cited by examiner

METHOD AND APPARATUS FOR IMPLEMENTING A DEVICE-TO-DEVICE (D2D) SERVICE IN A WIRELESS COMMUNICATION SYSTEM

CROSS-REFERENCE TO RELATED APPLICATIONS

The present Application claims the benefit of U.S. Provisional Patent Application Ser. No. 61/951,132 filed on Mar. 11, 2014, the entire disclosure of which is incorporated herein by reference.

FIELD

This disclosure generally relates to wireless communication networks, and more particularly, to a method and apparatus for implement a D2D service in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus of for implementing a D2D service are disclosed. The method includes the UE (User Equipment) receiving an indication to prohibit a transmission of a RRC (Radio Resource Control) connection request message for requesting a D2D dedicated resource for transmission. The method further includes the UE deciding whether to prohibit the transmission of the RRC connection request message at least based on the indication.

BRIEF DESCRIPTION OF THE DRAWINGS

"FIG. 2: Type 1 resource allocation".

"FIG. 2: D2D Resource request and response message for Type 2".

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including 3GPP Document "Draft Report of 3GPP TSG RAN WG2 meeting #85 held in Prague, Czech Republic, Feb. 10-14, 2014" (http://www.3gpp.org/ftp/tsg_ran/wg2_rl2/tsgr2_85/Report/History/R2-14xxxx_draft_report_RAN2_85_Prague_(v0.1).zip); TR 36.843 v12.0.0, "Study on LTE Device to Device Proximity services (Release 12)"; R2-141008, "TP for TR 36.843 capturing agreements from RAN2 #85", Qualcomm Incorporated (Rapporteur); R2-140474, "Open Issues of D2D Discovery", Qualcomm Incorporated; TS 24.301 v12.3.0, "Non-Access-Stratum (NAS) protocol for Evolved Packet System (EPS); Stage 3 (Release 12)"; TS 36.331 v12.0.0, "E-UTRA; Radio Resource Control (RRC); Protocol specification (Release 12)"; TS 36.321 v12.0.0, "E-UTRA; Medium Access Control (MAC) protocol specification (Release 12)"; and TS 36.304 v11.6.0, "E-UTRA; UE procedures in idle mode (Release 11)". The standards and documents listed above are hereby expressly incorporated by reference in their entirety.

Figure 1:
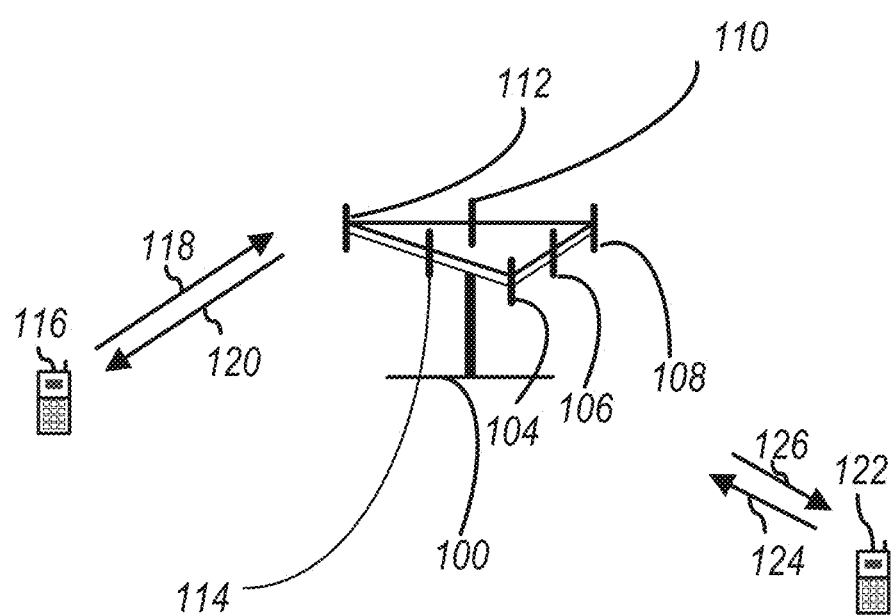
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
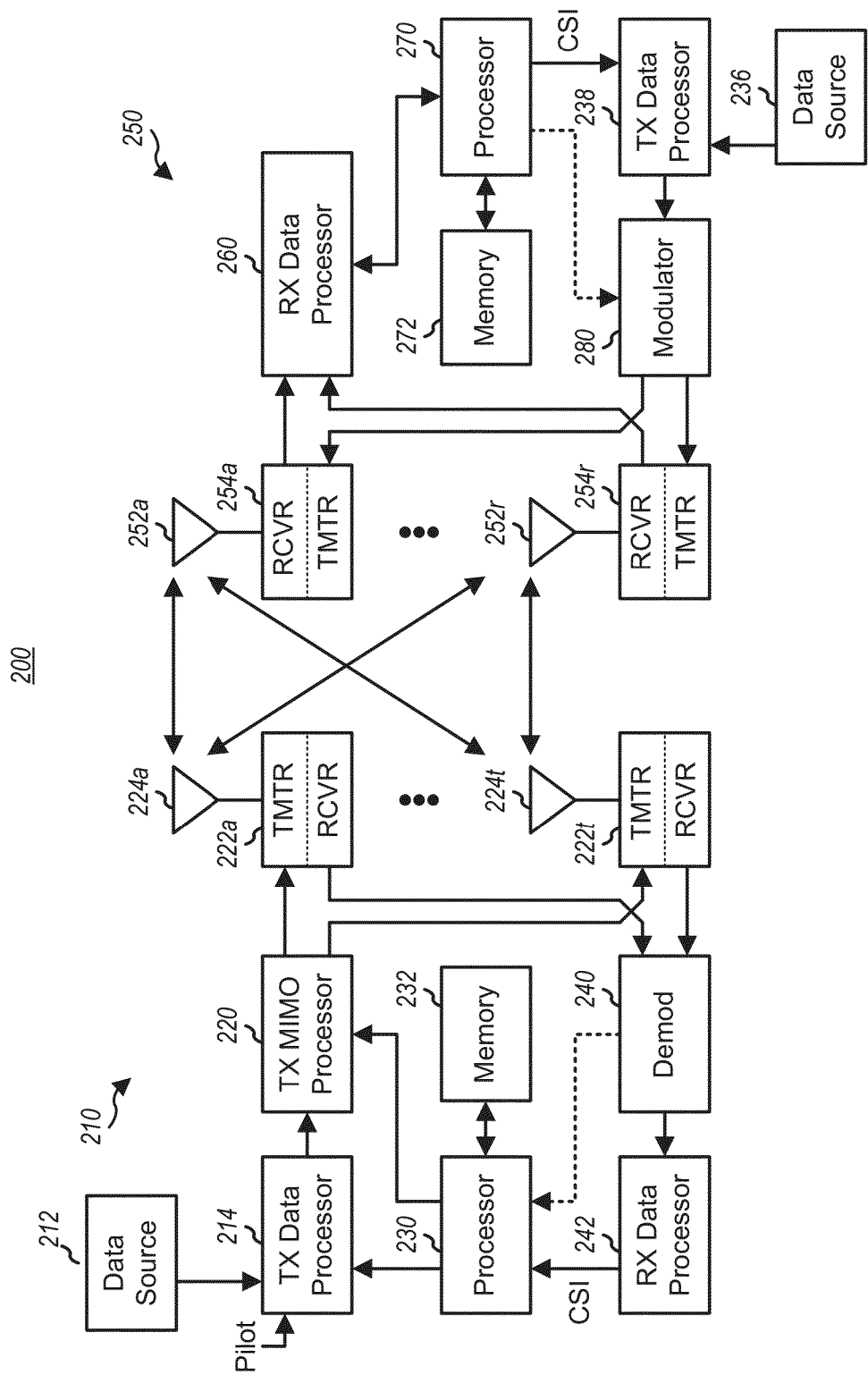
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
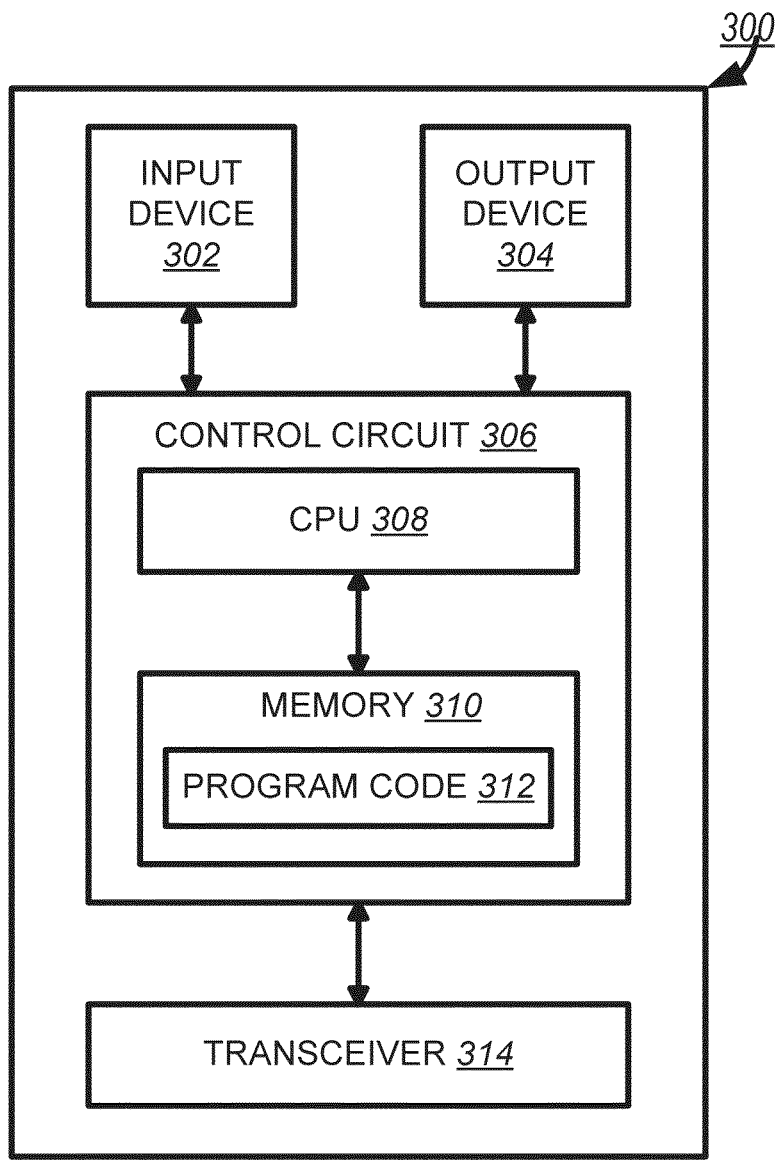
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
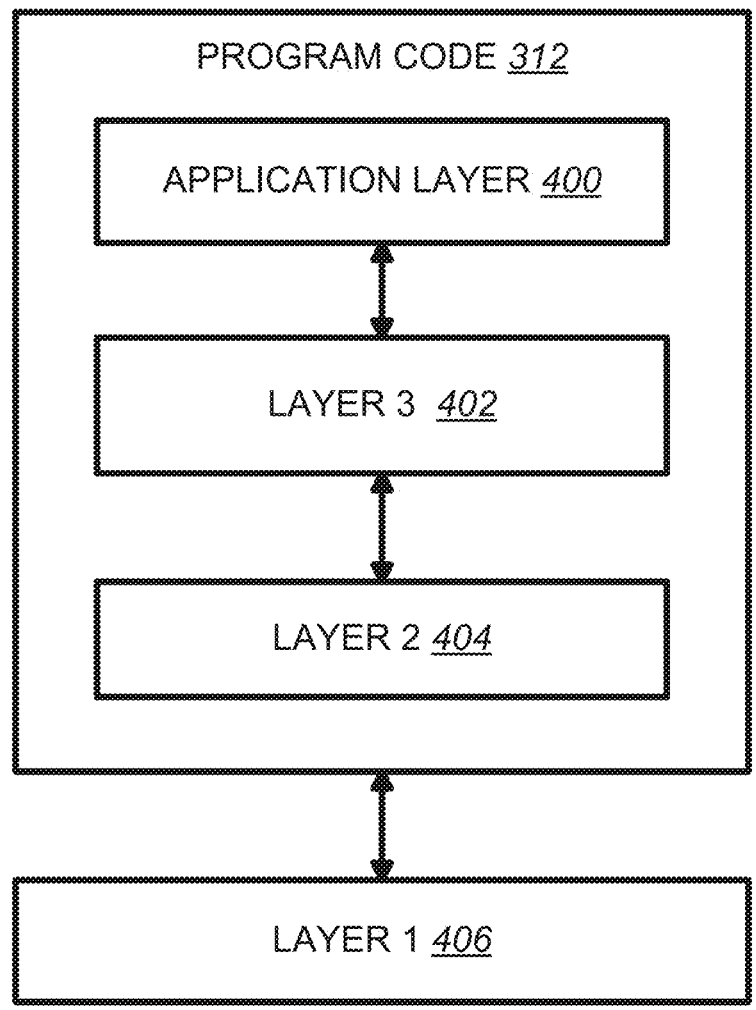
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE or LTE-A systems, the Layer 2 portion may include a Radio Link Control (RLC) layer and a Medium Access Control (MAC) layer. The Layer 3 portion may include a Radio Resource Control (RRC) layer.

As described in Draft Report of 3GPP TSG RAN WG2 meeting #85, the following agreement regarding D2D discovery was reached in RAN2 #85 meeting:

For in-coverage discovery . . .
1 the eNB may provide in SIB . . .
  a) a radio resource pool for discovery reception of Type 2B
  b) a radio resource pool for discovery transmission and reception in case of Type 1 (FFS for inter-cell discovery)
2 In case of Type 1, a UE autonomously selects radio resources from that indicated transmissions resource pool for discovery signal transmission.
2a As baseline we assume that NAS will handle authorization of D2D discovery transmission and reception. FFS whether there is also a need to disallow selected UEs to use Type 1 transmission resources on AS level (e.g. to avoid out of band emission problems).
3 In case of Type 2B, only an RRC Connected UE may request resources for transmission of D2D discovery messages from the eNB via RRC and the eNB assigns these resource via RRC. As baseline, UE releases the transmission resources the latest when the UE enters IDLE or when the eNB withdraws the resource by RRC signalling.
4 In case of Type 2B as baseline radio resource are allocated by RRC. Use of activation/deactivation of radio resources using PDCCH is FFS.
6 Receiving UEs monitor both Type 1 and Type 2B discovery resources
7 In the UE, the RRC protocol informs the discovery resource pool to MAC. RRC also informs allocated Type 2B resource to MAC.
11 There is no need for a MAC header.
12 We assume that D2D discovery is on a different transport channel than D2D communication.

As further described in Draft Report of 3GPP TSG RAN WG2 meeting #85, the following agreement regarding D2D discovery was also reached in the same meeting:

1 All UEs (Mode 1 ("scheduled") and Mode 2 ("autonomous")) are provided with a resource pool (time and frequency) in which they attempt to receive scheduling assignments.
FFS how the resource pool is configured/provided to UEs in or out of coverage. (e.g. pre-configured; provided by eNB in SIB; forwarded by UEs in coverage to UEs out of coverage)
2 In Mode 1, a UE requests transmission resources from an eNB. The eNB schedules transmission resources for transmission of scheduling assignment(s) and data.
2a In Mode 1, the UE sends a scheduling request (D-SR or RA) to the eNB followed by a BSR based on which the eNB can determine that the UE intends to perform a D2D transmission as well as the required amount resources.
2b In Mode 1, it is FFS how the eNB indicates the transmission resources to the UE.
2c In Mode 1, the UE needs to be RRC Connected in order to transmit D2D communication.
3 For Mode 2, UEs are provided with a resource pool (time and frequency) from which they choose resources for transmitting D2D communication.
3a The eNB controls whether UE may apply Mode 1 or Mode 2 transmission. Details FFS.
FFS: For Mode 2, UEs in the "edge of coverage", obtain the transmission resource pool by the eNB (e.g. SIB signalling).
FFS: For Mode 2, UEs out of coverage it is FFS how they obtain the transmission resource pool (e.g. pre-configured; from other UEs; . . . ).

Furthermore, the proposal to 3GPP TR 36.843 capturing the agreement was endorsed in 3GPP R2-141008 and includes details of D2D or Proximity-based Service. Although the work has not been completed, the resource management for D2D discovery is currently specified in 3GPP R2-141008 as follows:

6.3.3.3 Procedure

In case of Type 1, a UE autonomously selects radio resources from the indicated Type 1 transmission resource pool for discovery signal transmission.

In case of Type 2B, only an RRC CONNECTED UE may request resources for transmission of D2D discovery messages from the eNB via RRC. The eNB assigns resource via RRC.
  As baseline, UE releases the transmission resources the latest when the UE enters RRC_IDLE or when the eNB withdraws the resource by RRC signalling.
  In case of Type 2B as baseline radio resource are allocated by RRC. Use of activation/deactivation of radio resources using PDCCH is FFS.

Receiving UEs monitor both Type 1 and Type 2B discovery resources as authorised.

Similarly, although the work has not been completed, the resource management for D2D communication is currently specified in 3GPP R2-141008 as follows:

7.2.3.2 Radio Resource Allocation

UEs in-coverage and out-of-coverage need to be aware of a resource pool (time/frequency) for D2D communication reception.

All UEs (Mode 1 ("scheduled") and Mode 2 ("autonomous")) are provided with a resource pool (time and frequency) in which they attempt to receive scheduling assignments.

Editor's Note: It is FFS how the resource pool is configured/provided to UEs in or out of coverage. (e.g. pre-configured; provided by eNB in SIB; forwarded by UEs in coverage to UEs out of coverage)

In Mode 1, a UE requests transmission resources from an eNB. The eNB schedules transmission resources for transmission of scheduling assignment(s) and data.
  The UE sends a scheduling request (D-SR or RA) to the eNB followed by a BSR based on which the eNB can determine that the UE intends to perform a D2D transmission as well as the required amount resources.

Editor's Note: It is FFS how the eNB indicates the transmission resources to the UE.
  In Mode 1, the UE needs to be RRC Connected in order to transmit D2D communication.

For Mode 2, UEs are provided with a resource pool (time and frequency) from which they choose resources for transmitting D2D communication.

Editor's Note: It is FFS for Mode 2, UEs in the "edge of coverage", obtain the transmission resource pool by the eNB (e.g. SIB signalling).

Editor's Note: It is FFS for For Mode 2, UEs out of coverage how they obtain the transmission resource pool (e.g. pre-configured; from other UEs; . . . ).

The eNB controls whether UE may apply Mode 1 or Mode 2 transmission. Details FFS.

In addition, 3GPP R2-140474 describes a view regarding D2D discovery resource management as follows:

RAN1 has identified broadly two types of resource allocation for D2D discovery i.e. Non-UE specific and UE Specific discovery resources.

Type 1: a discovery procedure where resources for discovery signal transmission are allocated on a non UE specific basis Type 2: a discovery procedure where resources for discovery signal transmission are allocated on a per UE specific basis Type 2A: Resources are allocated for each specific transmission instance of discovery signals Type 2B: Resources are semi-persistently allocated for discovery signal transmission These two allocations mechanism differs only for D2D signal transmitter point of view. However from D2D signal receiver point of view they are same as all the UEs monitor D2D discovery resource pool. This discovery resource pool appears periodically and can have contiguous or interleaved subframes reserved for discovery operation. FIG. 1 shows the discovery resource pool.

Figure 5:
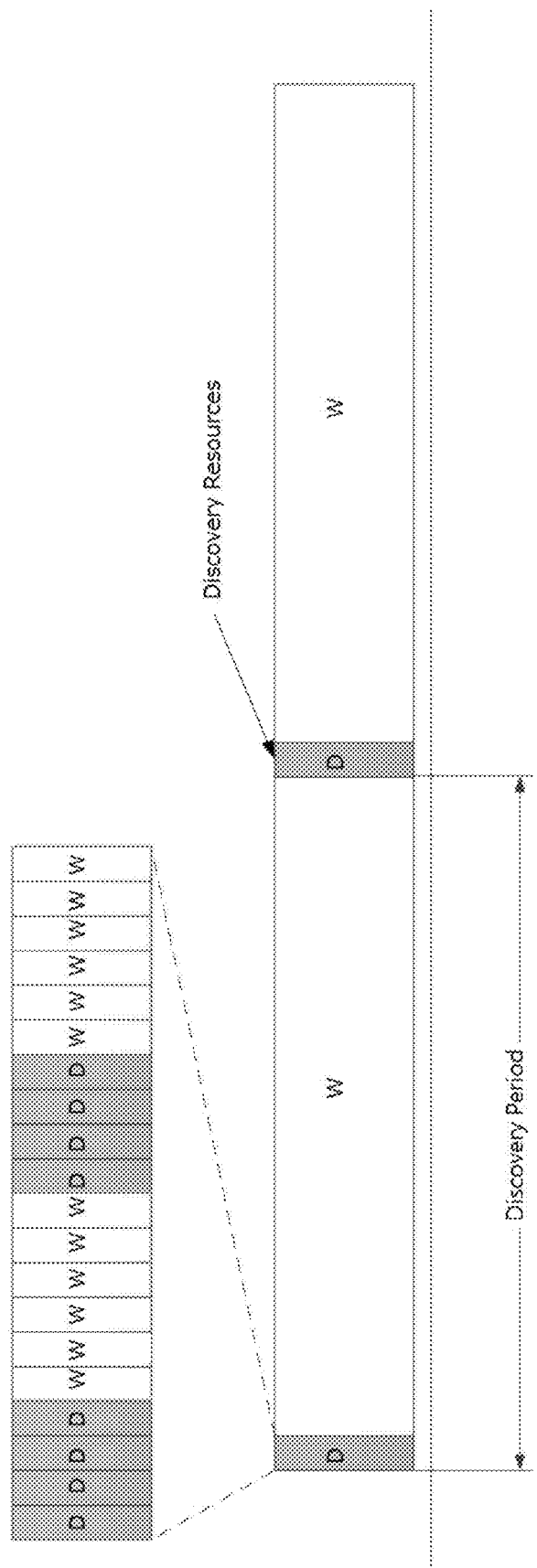
FIG. 5 is a reproduction of FIG. 1 of 3GPP R2-140474.

[FIG. 1 of R2-140474 entitled "FIG. 1: Periodic discovery resource allocation" has been reproduced as FIG. 5].

It is agreed in 3GPP RAN2 #83B is to support transmission and reception of discovery messages in RRC_IDLE and RRC_CONNECTED mode. So SIB message should be used for broadcast of the information of allocated radio resource pool for discovery.

Proposal 1: SIB Message is Used for Broadcast of the Information of Allocated Radio Resource Pool for Discovery.

TR 36.843 has following FFS:

OPEN ISSUE 1: Editor's note: The details of resource allocation (Type 1 or Type 2; SIB or dedicated) are FFS.

OPEN ISSUE 2: Editor's note: Detailed mechanism of how MAC layer determines radio resource for transmission is FFS.

In case of Type 1 Discovery UE selects radio resource from the discovery resource pool for discovery signal transmission once it is authorised to transmit D2D signal.

Figure 6:
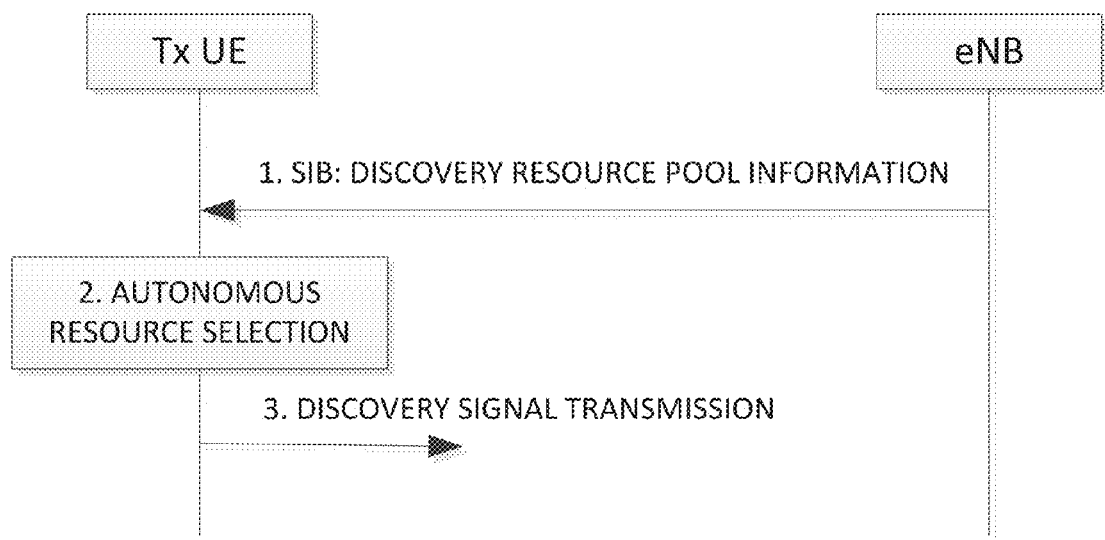
FIG. 6 is a reproduction of FIG. 2 of 3GPP R2-140474 entitled

[FIG. 2 of R2-140474 entitled "FIG. 2: Type 1 resource allocation" has been reproduced as FIG. 6].

Proposal 2: UE Autonomously Selects Radio Resources from SIB Indicated D2D Discovery Resource Pool for D2D Signal Transmission in Case of Type 1.

One of the open questions in draft agenda for RAN2 #85 is to clarify how message flows in particular for Type 2. It is clear that it will be in the form of request response type of mechanism; where UE request for dedicated radio resource for discovery message transmission and in response eNB allocates dedicated resources within the discovery resource pool.

Figure 7:
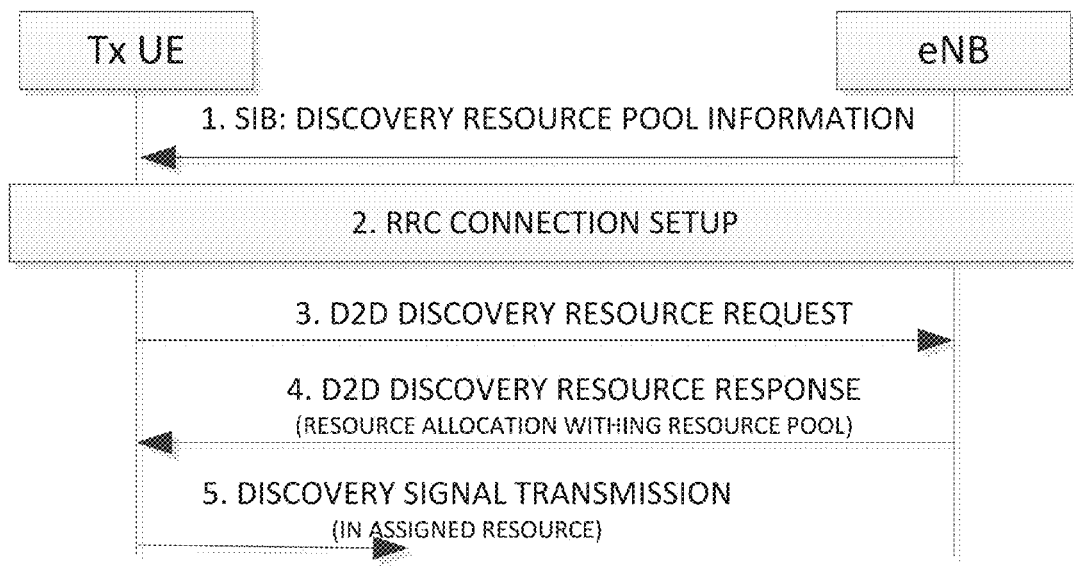
FIG. 7 is a reproduction of FIG. 2 of 3GPP R2-140474 entitled

[FIG. 2 of R2-140474 entitled "FIG. 2: D2D Resource request and response message for Type 2" has been reproduced as FIG. 7].

There are different possibilities depending on request/response is PHY, MAC or RRC layer messages. As it is assumed that discovery period (hence discovery message transmission) is in the order of several seconds. In case of semi static resource allocation for a UE i.e. Type 2B; there is not much gain in changing the allocated resources in the resource pool. Considering the large time scale of D2D discovery it is not necessary to perform request and response at PHY or MAC layer. RRC is most suitable for the request/response message for large time scale messages. Resource response message can be new message or it can be RRCConnectionReconfiguration message. D2D Discovery message transmission has different characteristics compared to VOIP where semi persistent scheduling is also used similar to Type 2B. PDCCH is used to activate/deactivate the usage of semi-persistent scheduled resources for VOIP because talk burst are very dynamic in nature. In case D2D discovery such dynamic nature is not expected hence activation/deactivation of radio resources (configured by RRC) using PDCCH is not required.

Proposal 3: In Case of Type 2 D2D Discovery Resource Request/Response for D2D Signal Transmission is Used as RRC Message.

Proposal 4: In Case of Type 2B Activation/Deactivation of Radio Resources (Configured by RRC) Using PDCCH is NOT Required.

In general, radio resources for D2D discovery and D2D communication could be divided into two categories: contention-based and dedicated. For D2D discovery, type 1 resource is contention-based; and type 2 (such as type 2b) is dedicated. For D2D communication, mode 2 is contention based; and mode 1 is dedicated.

A UE needs to request dedicated resources from network before the UE can use them. For D2D discovery, a UE may send a RRC (Radio Resource Control) message (such as D2D discovery resource request) to request radio resource for transmitting D2D discovery message. Network may allocate the resource via another RRC message (such as D2D discovery resource response). For D2D communication, a UE may send a scheduling request (as described in 3GPP TS 36.321 V12.0.0) (and BSR (as described in 3GPP TS 36.321 V12.0.0)) to request radio resource for D2D communication. Network may allocate the resource to the UE. Although more signaling would be involved, dedicated resources seems to be generally preferable from a UE point of view since its nature of contention free.

In addition, it has been agreed as baseline that a UE needs to be in connected mode in order to request and use dedicated resources. Therefore, it may be assumed that an idle mode UE, which would like to request dedicated D2D resource, would attempt to establish a RRC connection and request some resource after entering RRC connected mode.

However, D2D resources may not be always sufficient to fit the need of all UEs requesting D2D resources. Although the pool of D2D resources can be adjusted (for example, enlarged when too many UEs requesting D2D resources), it does not mean that the D2D resources can be extended without any limits, especially when the D2D resources share the same spectrum as the resources for infrastructure transmission (e.g., the transmission between UE and eNB). A congested cell may not be able to extend the D2D resource pool. Therefore, it would be important for D2D resources (especially for dedicated resources) to be managed efficiently.

On the other hand, when D2D dedicated resources are congested, a UE may continuously transmit a message to request D2D dedicated resources if the UE cannot get the resources. It is a waste of signaling overhead and UE power consumption.

To deal with the situation where the resources are insufficient, a priority among different type of accesses should exist so that the resources can be allocated based on the priority of the access type. For example, unicast traffic may be prioritized over D2D traffic, or public safety access may be prioritized over non-public safety access. The access with lower priority may be prohibited to use the resources so that the access with higher priority can be served properly.

Figure 8:
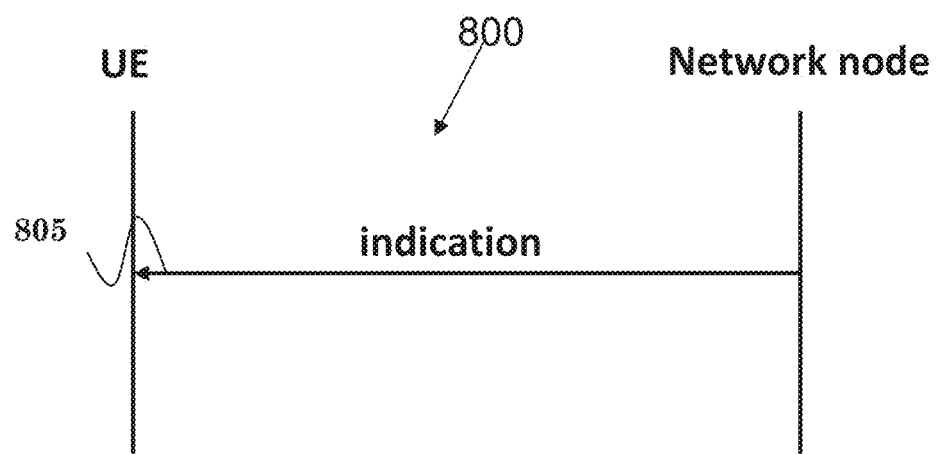
FIG. 8 is a message flow diagram according to one exemplary embodiment.
Figure 9:
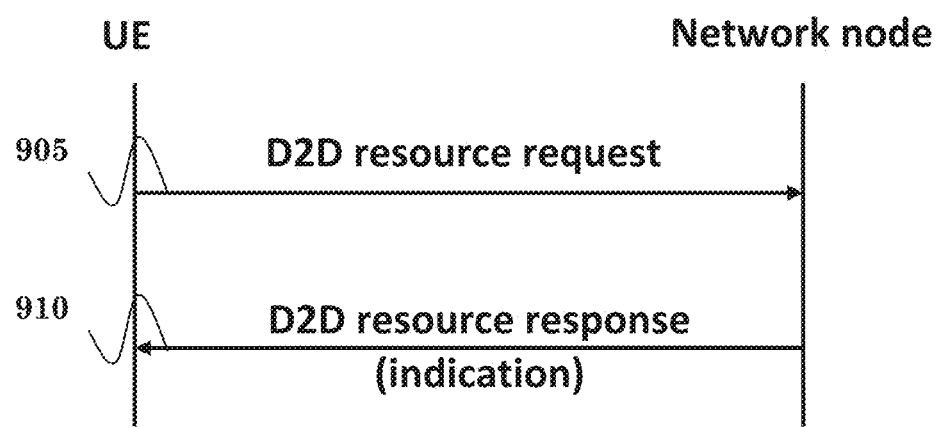
FIG. 9 is a message flow diagram according to one exemplary embodiment.

As shown in step 805 FIG. 8, the general concept of the invention is that an indication, about prohibition of D2D dedicated resource for transmission, is transmitted from a network node (e.g., eNB) to a UE that would like to use D2D resource for transmission. FIG. 9 is a message flow diagram 900 in accordance with one exemplary alternative embodiment. In step 905, a UE sends a D2D resource request to a network node. In step 910, the network node responds to the D2D resource request by sending to the UE a D2D resource response that includes the indication.

The UE would decide whether it is prohibited based on the indication. Moreover, if the UE is prohibited, it may attempt to use contention based D2D resources (if available). Alternatively, the UE may not execute D2D service(s) if contention-based D2D resources are not available.

In this situation, the network node could (for example, based on a level of congestion in a cell) dynamically control whether the UE uses D2D dedicated resource or D2D contention based resource for transmission or whether the UE should suspend (D2D) service(s) temporarily. Other UEs may not be affected. From the UE's point of view, whether the UE uses D2D dedicated resource or D2D contention based resource to perform D2D transmission (e.g., for D2D communication or D2D discovery or for the same D2D service) is not fixed (or is dynamic). The UE may also suspend D2D service(s) (temporarily).

In one embodiment, the indication would provide to the UE one or more of the following information:
- A time period for the prohibition.
- A parameter used by a UE to perform a check whether D2D dedicated resource for transmission is prohibited. The UE may perform the check before transmitting a message used to request D2D dedicated resource for transmission. For example, the check filters an attempt to transmit the message in a probabilistic manner such that an attempt has some percentages to be passed and some percentages to be barred.
- A specific D2D service category (such as social networking, advertising, etc.) is prohibited.
- A specific D2D type (such as D2D discovery, D2D communication, etc.) is prohibited.
- A specific D2D usage (such as public safety, commercial, etc.) is prohibited.
- D2D service(s) having a specific QoS requirement is prohibited.
- D2D service(s) having a specific priority is prohibited.

In one embodiment, the indication could be associated with a specific type of D2D resources, such as D2D dedicated resource, D2D contention-based resources, or all D2D resources.

Furthermore, the indication could be received by the UE during a procedure of requesting D2D dedicated resources. The indication could be included in a message (such as a resource response message) in response to a message requesting D2D dedicated resource for transmission (such as a resource request message). When the UE is prohibited, the UE would not be allowed to transmit a message to request D2D dedicated resource for transmission.

For an idle mode UE who needs to establish a RRC connection in order to request D2D dedicated resources for transmission, the indication could be received by the UE during a RRC connection establishment procedure, which could be for the purpose of requesting D2D dedicated resource for transmission. The indication could be included in RRC Connection Reject message (as described in 3GPP TS 36.331 V12.0.0) or RRC Connection Setup message (as described in 3GPP TS 36.331 V12.0.0). Alternatively, the indication could be received from system information. When the UE is prohibited, the UE would not be allowed to transmit a message to request D2D dedicated resource for transmission. Alternatively, when the UE is prohibited, the UE would not be allowed to transmit a RRC Connection Request message (as described in 3GPP TS 36.331 V12.0.0), which could be for the purpose of requesting D2D dedicated resource for transmission.

Figure 10:
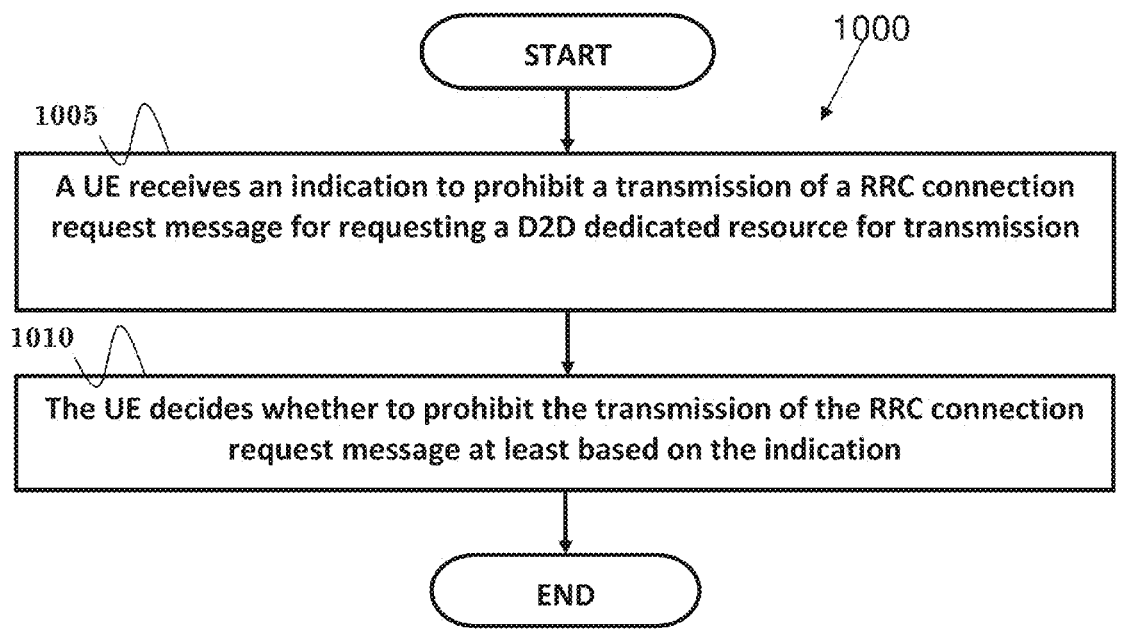
FIG. 10 is a flow chart according to one exemplary embodiment.

FIG. 10 is a flow chart 1000 in accordance with one exemplary embodiment from the perspective of a UE. In step 1005, the UE receives an indication to prohibit a transmission of a RRC (Radio Resource Control) connection request message for requesting a D2D dedicated resource for transmission. In step 1010, the UE decides whether to prohibit the transmission of the RRC connection request message at least based on the indication.

Referring back to FIGS. 3 and 4, the device 300 includes a program code 312 stored in memory 310 of a UE. The CPU 308 could execute program code 312 (i) to receive an indication to prohibit a transmission of a RRC connection request message for requesting a D2D dedicated resource for transmission, and (ii) to decide whether to prohibit the transmission of the RRC connection request message at least based on the indication. In addition, the CPU 308 can execute the program code 312 to perform all of the above-described actions and steps or others described herein.

Figure 11:
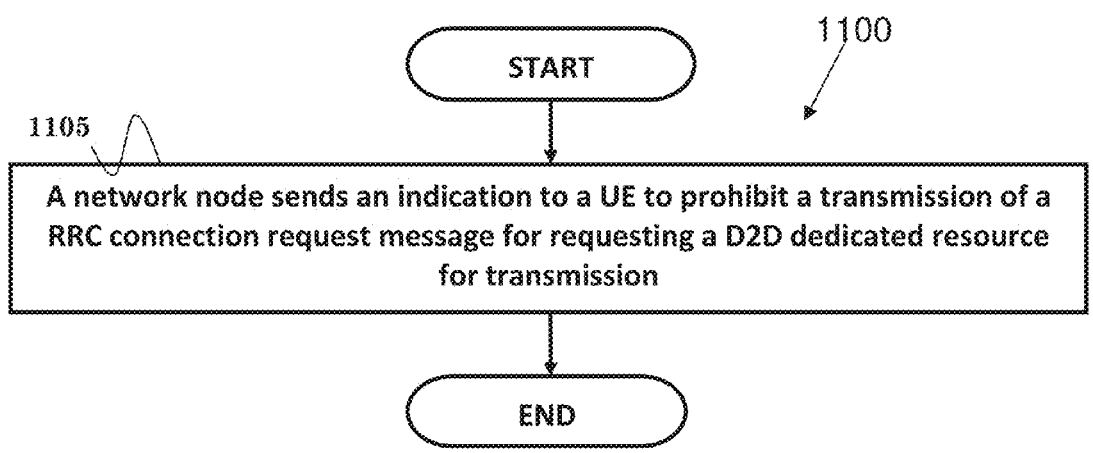
FIG. 11 is a flow chart according to one exemplary embodiment.

FIG. 11 is a flow chart 1100 in accordance with one exemplary embodiment. In step 1105, a network node sends an indication to a UE to prohibit a transmission of a RRC connection request message for requesting a D2D dedicated resource for transmission.

Referring back to FIGS. 3 and 4, the device 300 includes a program code 312 stored in memory 310 of a network node. The CPU 308 could execute program code 312 to send an indication to a UE to prohibit a transmission of a RRC connection request message for requesting a D2D dedicated resource for transmission. In addition, the CPU 308 can execute the program code 312 to perform all of the above-described actions and steps or others described herein.

Figure 12:
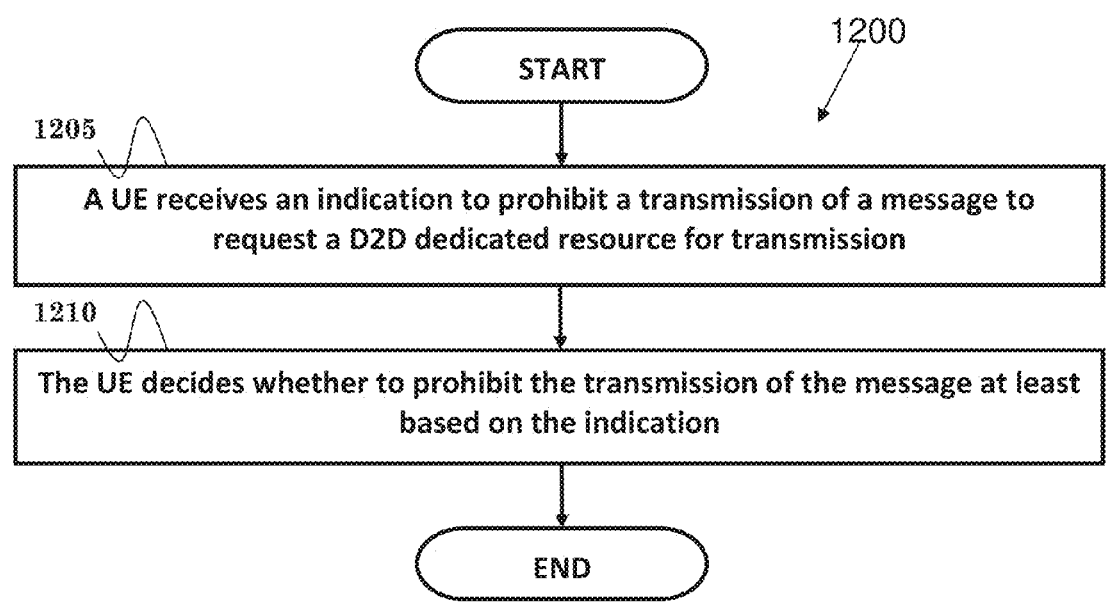
FIG. 12 is a flow chart according to one exemplary embodiment.

FIG. 12 is a flow chart 1200 in accordance with one exemplary embodiment from the perspective of a UE. In step 1205, the UE receives an indication to prohibit a transmission of a message to request D2D dedicated resource for transmission. In step 1210, the UE decides whether to prohibit the transmission of the message at least based on the indication.

Referring back to FIGS. 3 and 4, the device 300 includes a program code 312 stored in memory 310 of a UE. The CPU 308 could execute program code 312 (i) to receive an indication to prohibit a transmission of a message to request D2D dedicated resource for transmission, and (ii) to decide whether to prohibit the transmission of the message at least based on the indication. In addition, the CPU 308 can execute the program code 312 to perform all of the above-described actions and steps or others described herein.

Figure 13:
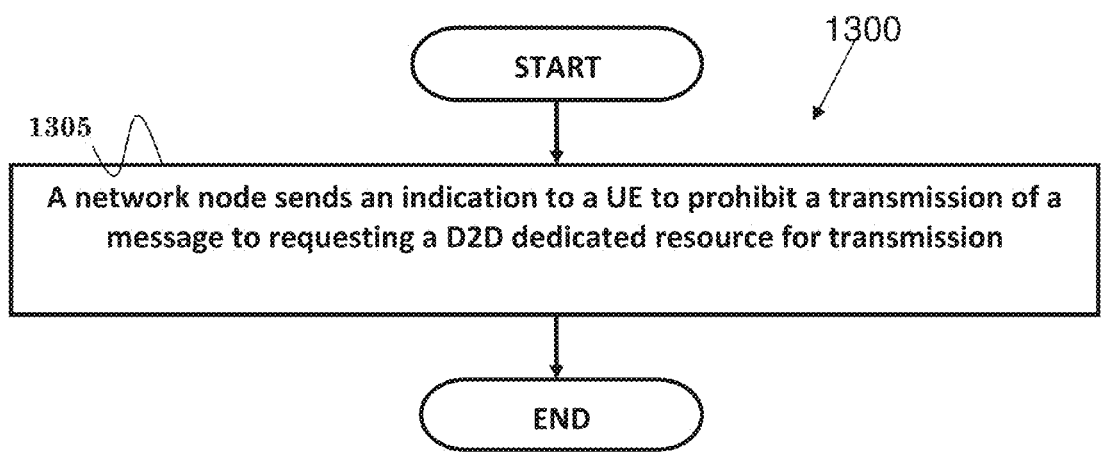
FIG. 13 is a flow chart according to one exemplary embodiment.

FIG. 13 is a flow chart 1300 in accordance with one exemplary embodiment. In step 1305, a network node sends an indication to a UE to prohibit a transmission of a message to request D2D dedicated resource for transmission.

Referring back to FIGS. 3 and 4, the device 300 includes a program code 312 stored in memory 310 of a network node. The CPU 308 could execute program code 312 to send an indication to a UE to prohibit a transmission of a message to request D2D dedicated resource for transmission. In addition, the CPU 308 can execute the program code 312 to perform all of the above-described actions and steps or others described herein.

In one embodiment, the indication does not prohibit a transmission of a RRC connection request message for mobile originating call, mobile originating signaling, and/or delay tolerant access (as described in 3GPP TS 36.331 V12.0.0). In one embodiment, the UE could decide whether to prohibit the transmission before transmitting the RRC connection request message or when the UE attempts to transmit the RRC connection request message. In another embodiment, the UE could decide whether to prohibit the transmission also based on whether the transmission is for the purpose of public safety.

In one embodiment, the indication could be received during a RRC connection establishment procedure (as described in 3GPP TS 36.331 V12.0.0). Furthermore, the RRC connection establishment procedure could be for the purpose of requesting D2D dedicated resource for transmission. The establishment cause in the RRC connection request message could be set to a value for D2D (or D2D resource request), D2D communication, or D2D discovery. Alternatively, the indication could be received during a procedure of requesting D2D dedicated resource for transmission.

In one embodiment, the indication could be in a D2D type basis (such as communication and/or discovery), a D2D service category basis (such as social networking and/or advertising), a D2D usage basis (such as public safety and/or commercial), a QoS (Quality of Service) level basis (such as QoS class), or a priority basis (such as predefined priority). In addition, the indication could be included in a system information, a message in response to the message used to request D2D dedicated resource for transmission, a RRC connection reject message, a RRC connection setup message, a RRC connection reconfiguration message (as described in 3GPP TS 36.331 V12.0.0), a resource response message, or a resource reject message. Furthermore, the message used to request D2D dedicated resource for transmission could be a resource request message, a RRC connection request message, a scheduling request (SR), or a buffer status report (BSR). In one embodiment, the UE could decide whether to prohibit the transmission before transmitting the message or when the UE attempts to transmit the message. In another embodiment, the UE could decide whether to prohibit the transmission also based on whether the transmission is for the purpose of public safety.

In one embodiment, the indication could include a barring factor such as a probability about whether to prohibit or not. The barring factor could correspond to a new call type for D2D other than the current call type defined in 3GPP TS 24.301 v12.3.0.

In one embodiment, the UE could attempt to use D2D contention-based resources when the transmission is prohibited.

In one embodiment, the UE could be allowed to perform the transmission for the purpose of public safety even when the transmission is prohibited. Furthermore, the prohibition could be alleviated when the UE performs the transmission for the purpose of public safety. Alternatively, the prohibition could be maintained when the UE performs the transmission for public safety. In another embodiment, the prohibition could be alleviated when the UE changes the serving cell, such as cell reselection (as described in 3GPP TS 36.304 V11.6.0).

In one embodiment, the UE enters a prohibition period for the transmission upon receiving the indication. Alternatively, the UE enters a prohibition period for the transmission when the UE decides to prohibit the transmission. Furthermore, the prohibition period could be handled by a timer (such as a D2D dedicated resource prohibit timer). The length of the prohibition period could be included in the indication, signaled by the network, or determined based on one or more than one parameter signaled by network. Moreover, the parameter could be signaled in system information.

In addition, when the UE enters the prohibition period, the UE could attempt to use D2D contention-based resources. Upon the UE leaves the prohibition period, the UE could attempt to request D2D dedicated resources. Also, during the prohibit period, the UE is not allowed to transmit the message, to request D2D dedicated resources for transmission, or to use D2D dedicated resources for transmission.

In one embodiment, the UE could be in idle mode (e.g., RRC_Idle (as described in 3GPP TS 36.331 V12.0.0)). Alternatively, the UE could be in connected mode (e.g., RRC_Connected (as described in 3GPP TS 36.331 V12.0.0)).

In one embodiment, the D2D dedicated resource could be used for D2D discovery (such as Type 2). Alternatively, the D2D dedicated resource could be used for D2D communication (such as Mode 1). The D2D contention-based resource could be used for D2D discovery (such as Type 1). Alternatively, the D2D contention-based resource could be used for D2D communication (such as Mode 2). Furthermore, the D2D dedicated resource for transmission could be not for public safety.

The invention generally enables efficient control of D2D resources, and save signaling overhead and power consumption of a UE when the resources are insufficient.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of implementing a D2D (Device-to-Device) service in a UE (User Equipment), comprising:
   receiving an indication to prohibit a transmission of a RRC (Radio Resource Control) connection request message for requesting a D2D dedicated resource for transmission;
   deciding whether to prohibit the transmission of the RRC connection request message at least based on the indication; and
   attempting to use D2D contention-based resources when the transmission is prohibited.

2. The method of claim 1, wherein the indication does not prohibit a transmission of a RRC connection request message for mobile originating signaling, or delay tolerant access.

3. The method of claim 1, wherein the UE decides whether to prohibit the transmission before transmitting the RRC connection request message.

4. The method of claim 1, wherein the indication is in a D2D type basis, including communication and/or discovery.

5. The method of claim 1, wherein the indication is included in a system information.

6. The method of claim 1, wherein the UE is in idle mode.

7. The method of claim 1, wherein the D2D dedicated resource is used for D2D discovery.

8. The method of claim 1, wherein the D2D dedicated resource is used for D2D communication.

9. The method of claim 1, wherein the D2D contention-based resources are used for D2D discovery.

10. The method of claim 1, wherein the D2D contention-based resources are used for D2D communication.

11. A UE (User Equipment) for implementing a D2D (Device-to-Device) service in a wireless communication system, the UE comprising:
    a control circuit;
    a processor installed in the control circuit; and
    a memory installed in the control circuit and operatively coupled to the processor;
    wherein the processor is configured to execute a program code stored in the memory to:
       receive an indication to prohibit a transmission of a RRC (Radio Resource Control) connection request message for requesting a D2D dedicated resource for transmission;
       decide whether to prohibit the transmission of the RRC connection request message at least based on the indication; and
       attempt to use D2D contention-based resources when the transmission is prohibited.

12. The UE of claim 11, wherein the indication is included in a system information.

13. The UE of claim 11, wherein the UE decides whether to prohibit the transmission before transmitting the RRC connection request message.

14. The UE of claim 11, wherein the indication does not prohibit a transmission of a RRC connection request message for mobile originating signaling, or delay tolerant access.

15. The UE of claim 11, wherein the indication is in a D2D type basis, including communication and/or discovery.

16. The UE of claim 11, wherein the D2D dedicated resource is used for D2D discovery.

17. The UE of claim 11, wherein the D2D dedicated resource is used for D2D communication.

18. The UE of claim 11, wherein the UE is in idle mode.

19. The UE of claim 11, wherein the D2D contention-based resources are used for D2D discovery.

20. The UE of claim 11, wherein the D2D contention-based resources are used for D2D communication.

* * * * *